July 7, 1936.  C. E. REED  2,047,111

EARTH BORING APPARATUS

Original Filed April 29, 1932   6 Sheets-Sheet 1

Inventor:
Clarence E. Reed,
By Spear, Drawson & Hall
Attorneys.

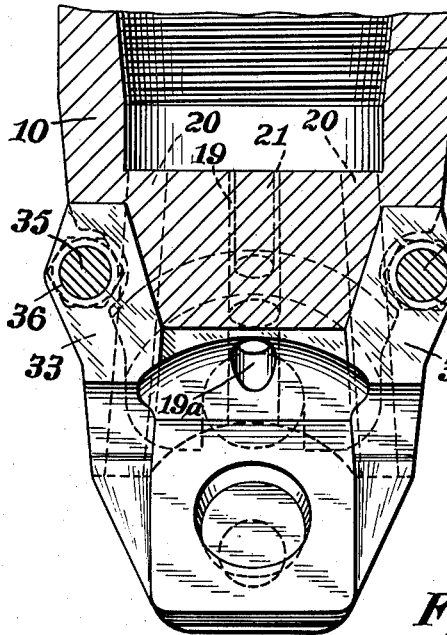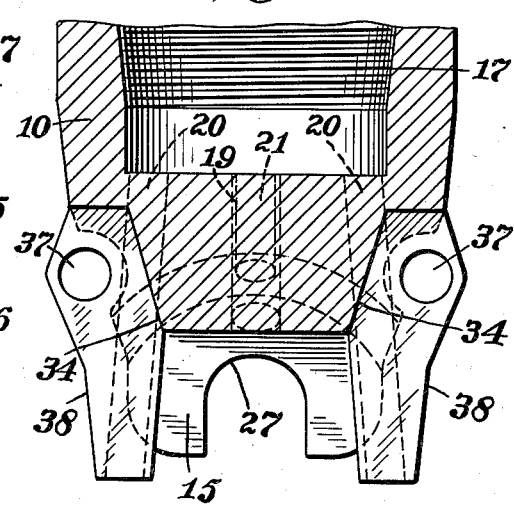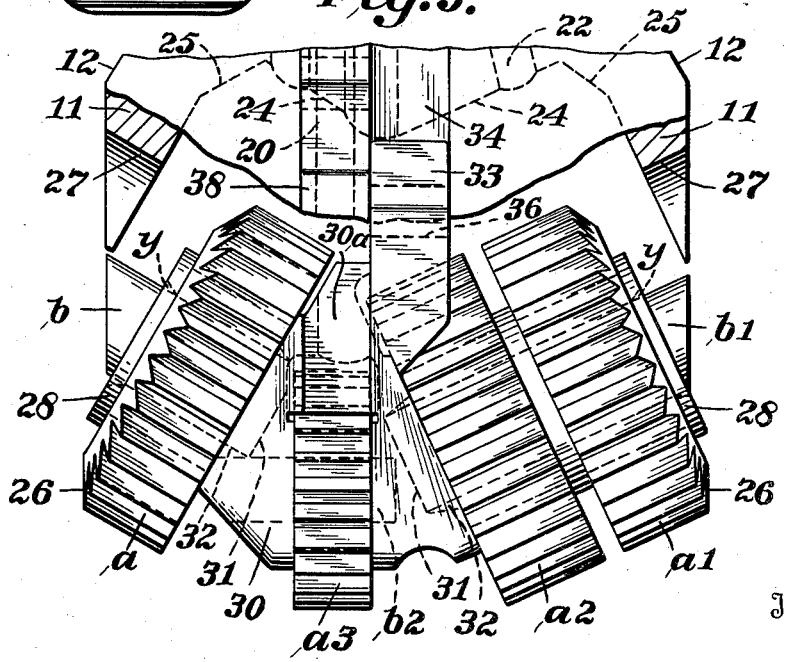

July 7, 1936.  C. E. REED  2,047,111

EARTH BORING APPARATUS

Original Filed April 29, 1932   6 Sheets-Sheet 3

Inventor:

Clarence E. Reed,

By Spear, Donaldson & Steel

Attorneys

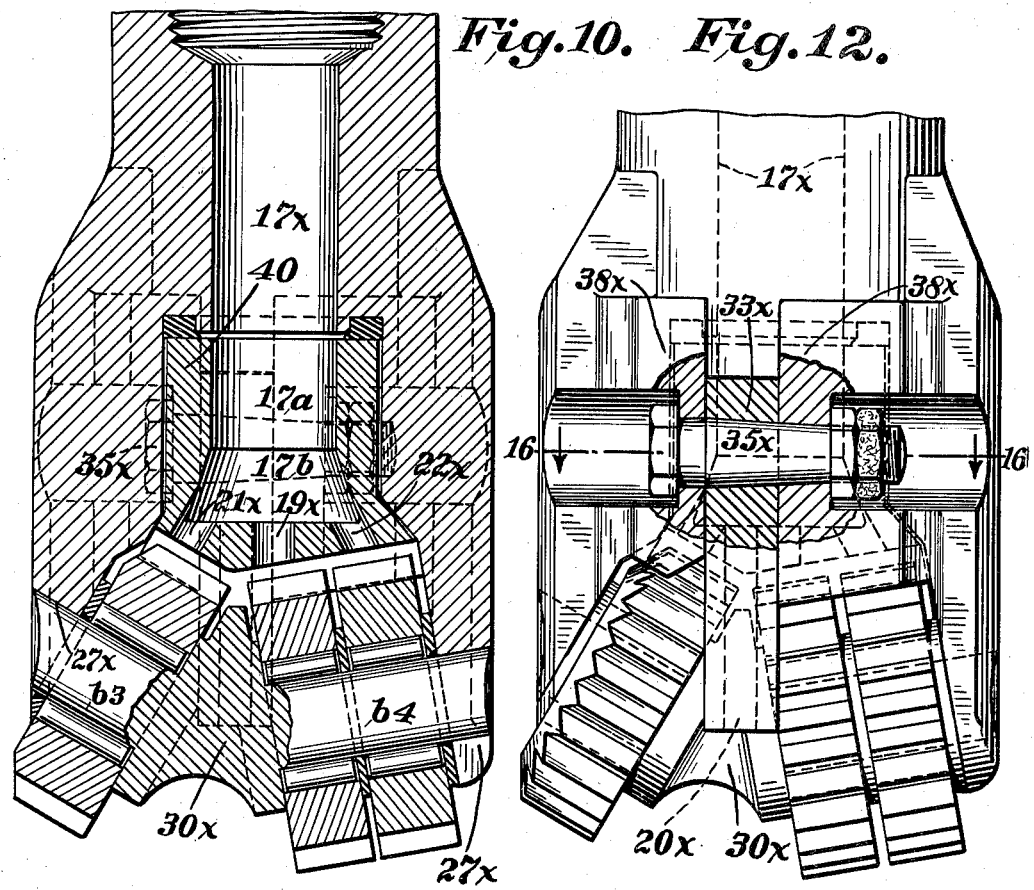
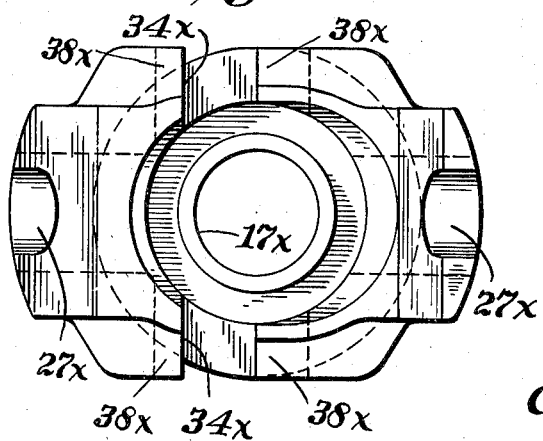
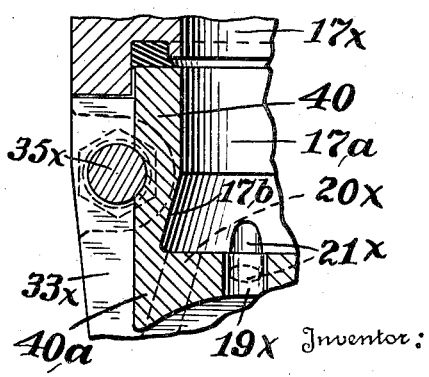

July 7, 1936.  C. E. REED  2,047,111
EARTH BORING APPARATUS
Original Filed April 29, 1932   6 Sheets-Sheet 5

Inventor:
Clarence E. Reed,
By Spear, Donaldson & Hull
Attorneys

July 7, 1936.                C. E. REED                2,047,111
                        EARTH BORING APPARATUS
            Original Filed April 29, 1932    6 Sheets-Sheet 6

Inventor:

Clarence E. Reed,
By Spear, Dunwosher & Hall
Attorneys

Patented July 7, 1936

2,047,111

UNITED STATES PATENT OFFICE 2,047,111

EARTH BORING APPARATUS

Clarence E. Reed, Wichita, Kans., assignor to Chicago Pneumatic Tool Company, New York, N. Y., a corporation of New Jersey Application April 29, 1932, Serial No. 608,295
Renewed May 27, 1936

29 Claims. (Cl. 255—71)

One object of the invention is to provide a simple, rugged earth boring drill bit in which all the rotary toothed cutters are carried by a spindle member constituting an assembly capable of being placed into connection with or removed from the bit head as one body, the attachment to or detachment from the bit head being accomplished readily and expeditiously.

The features and combination of parts constituting the invention are shown in the accompanying drawings in which—

Fig. 3 is a transverse vertical section of the bit head taken centrally of Fig. 1 with the cutter carrier in place but with the cutters and their spindles omitted.

Fig. 4 is a view similar to Fig. 3 but showing only the bit head.

Fig. 5 is a side elevation of the lower portion of the bit head partly broken away and with the cutter assembly partly inserted into place.

Fig. 10 is a central vertical sectional view of another form of bit head and roller cutter unit embodying the invention.

Fig. 11 is a bottom plan view of the bit head of Fig. 10.

Fig. 12 is a side view of Fig. 10 with parts broken away.

Fig. 13 is a detailed sectional view of the joint between the bit head and the roller cutter unit.

In these drawings, 10 indicates the cylindrical body portion of the bit head from which depend the end walls 11, 11. These end walls extend out beyond the periphery of the cylindrical portion, 10 the outer faces including the inclined faces 12 and the vertical outer faces 13, the latter being so related to the outside cutters $a$, $a^1$ that clearance will exist between these end faces 13 and the wall of the hole indicated by the dot and dash lines 14, Fig. 1.

Figure 1:
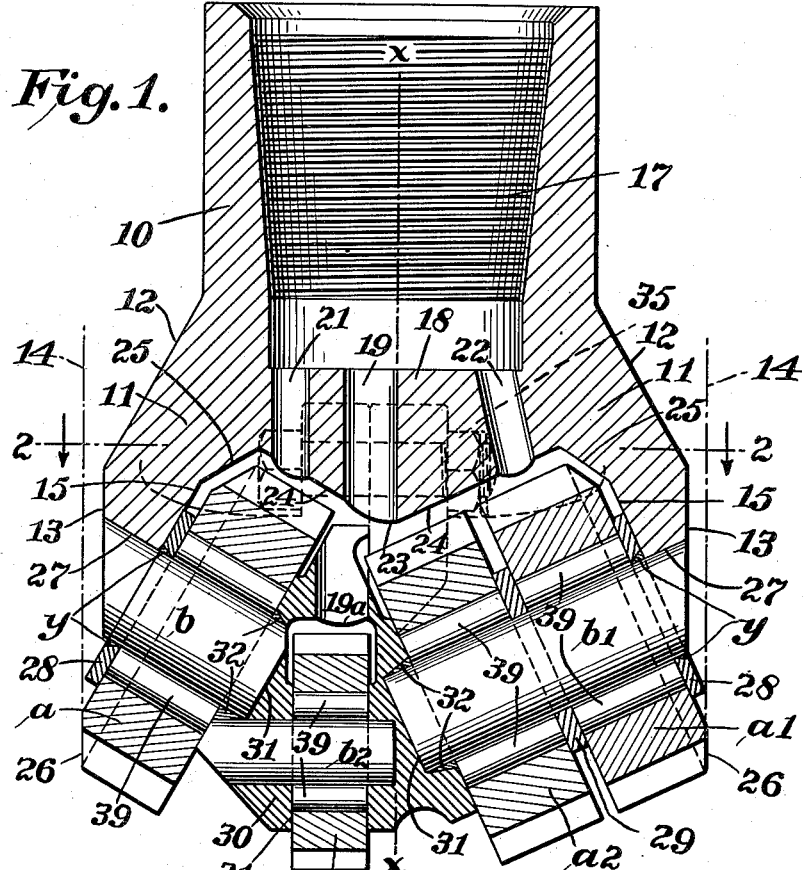
Figure 1 is a central vertical sectional view of a bit head embodying the invention in one form, said section being taken along the longitudinal dimension or end to end of the bit head.

The inner faces of the end walls 11 flare downwardly presenting inner flat faces 15 diverging outwardly and downwardly relative to the vertical axis of the drill indicated by the line $x$—$x$, Fig. 1.

The bit head has a bore 17 which receives flushing fluid from the hollow drill stem and this fluid is distributed through ports 19, 20, 21 and 22 of the central body of the bit head indicated generally at 18, as will be later referred to. The under side of the main body portion 18 of the head has a downward protuberant formation 23, with upwardly and outwardly inclined faces 24 extending substantially to the upper ends of the flaring inner faces 15 of the depending end portions 11 of the bit head, there being short inclined sections 25 intermediate the faces 15 and 24 to conform with the bevelled edges 26 of the cutters $a$, $a^1$. This protuberant formation 23 with its upwardly inclined faces 24 form recesses to accommodate the upper parts of rotary toothed cutters. The cutters $a$, $a^1$ are of cylindrical form and are mounted on spindle $b$, $b^1$.

These spindles project outwardly and upwardly in relation to each other and in relation to the vertical axis $x$—$x$ of the drill head. They extend at right angles to the inclined inner flaring faces 15 of the end walls of the bit head and they fit up into notches or recesses 27, see Figs. 1, 4 and 5, formed in the depending end walls of the said head.

Washers 28 fit between the outer sides of these cutters $a$, $a^1$ and the inner faces 15 of the end walls 11 of the bit head and the spindles $b$, $b^1$, and washers are welded at $y$. The spindle $b^1$ also carries a roller cutter $a^2$ and there is a spacer washer 29 between the roller cutters $a^1$, $a^2$. The inner ends of the spindles $b$, $b^1$ are connected with a carrier block 30 which is provided with sockets

31 wherein said spindles are welded at 32 so that the said carrier and the roller cutters constitute an integral unit which may be handled as one body. Also there is in this particular form of the invention a smaller cylindrical roller cutter $a^3$ carried by a spindle $b^2$ which also is mounted in the carrier block 30, being welded in position at 32, and this cutter also forms part of the complete integral cutter unit. The cutters $a$, $a^1$, $a^2$, are inclined while the cutter $a^3$ is arranged on a horizontal axis and lies in a recess 31$x$ of the central portion 30 of the cutter carrier means. These roller cutters cut substantially the entire area at the bottom of the hole. As before stated, the roller cutter unit, when inserted into place within the recess of the bit head, has the ends of its spindles $b$, $b^1$ lying in the recesses or notches 27 of the depending end walls of the head. The spindle means has upwardly extending lugs or arms 33, one at each side of and integral with the central portion 30 of the spindle assembly. When the roller cutter unit is seated in the head these arms or lugs 33 fit into recesses 34 in the sides of the bit head wherein they are held by bolts 35 passing through openings 36 therein and through openings 37 in the wall or lug 38 defining one side of the recess 34. This recess may be considered to be the corner space provided by the projection 38 and the side of the bit head. The bolts 35 are held by nuts 35$a$.

The carrier block 30, together with the spindle and roller cutters, readily can be removed as one body or unit by removing the bolts 35 and simply withdrawing the unit as a whole from the recess in the bit head in the direction of the axis of said head. It will be seen that the recess 31$x$ is located between the downwardly projecting supports for the inner ends of side spindles $b$ and $b^1$. The inner walls of these supports have seat recesses for spindle $b$, these seat recesses opening into recess 31$x$ and their axes being horizontally coincident.

Roller bearings 39 are employed for the various cutters. These are placed in position in making up the unit, it being noted that when the washers 28 and 29 are put in place the roller bearings will be maintained against displacement.

The flushing fluid passing through the port 19 will act mainly upon the cutters $a^2$, $a^3$, the block 30 having a port 19$a$ for the passage downwardly of the flushing fluid to the cutter $a^3$.

The flushing fluid passing through the ports 21 and 22 is directed to the upper sides of the cutters $a$, $a^1$ and $a^2$.

Flushing fluid passing through the ports 20 which lie partly in the lugs 38 also acts upon the cutters and particularly those marked $a$ and $a^3$. These conduits also deliver flushing fluid "offside" in respect to the cutters $a$ and $a^3$. They incline downwardly as indicated in dotted lines Fig. 4. These conduits also deliver the flushing fluid laterally of the sides of the head to the bottom of the bore hole.

Fig. 5 shows the unit composed of the cutters, spindles, roller bearings and block 30 carrying all of these parts in position relative to the bit head ready for insertion as one body thereinto, the lugs 33 of the block 30 having partly entered the recess 34.

Figure 8:
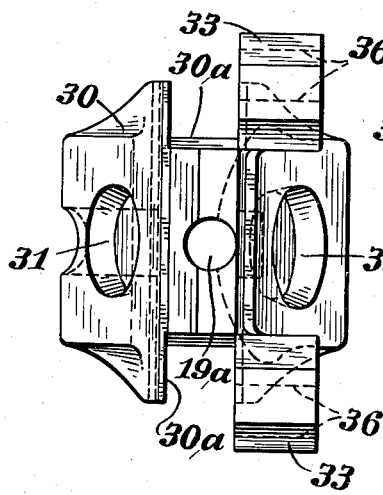
Fig. 8 is a plan view of Fig. 6.
Figure 9:
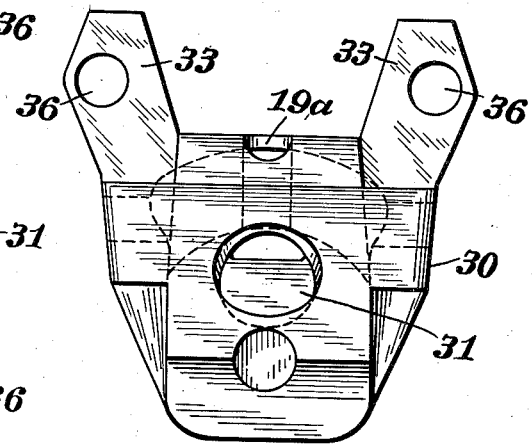
Fig. 9 is a view of Fig. 6 looking from the left thereof.
Figure 6:
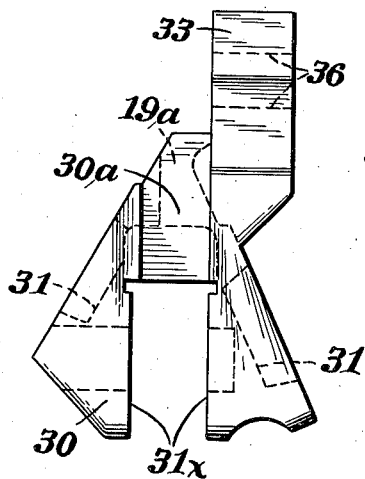
Fig. 6 is a side view of this cutter carrier, or the central portion of the spindle means with the spindle omitted.
Figure 7:
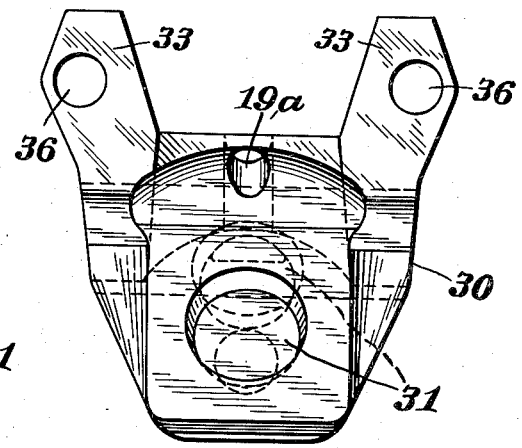
Fig. 7 is a view of the cutter carrier block of Fig. 6 looking from the right of said Fig. 6.
Figure 14:
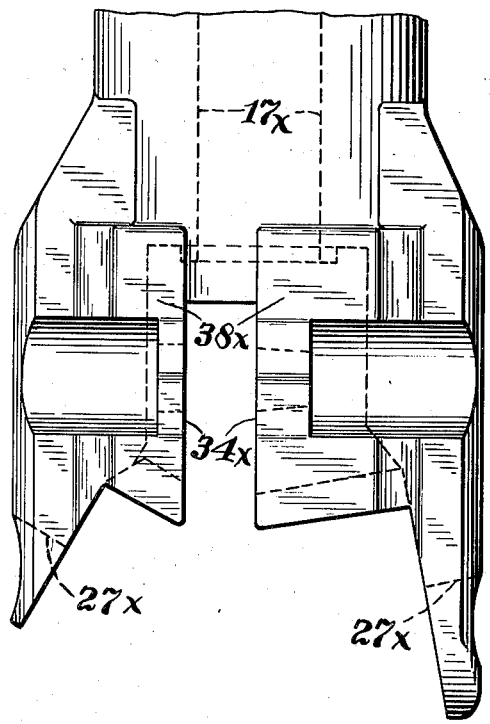
Fig. 14 is a side view of the bit head with the roller cutter unit omitted.
Figure 15:
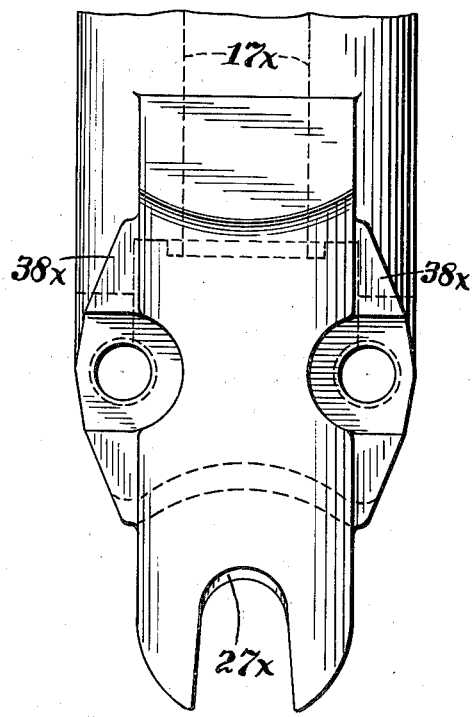
Fig. 15 is an end view of the bit head of Fig. 14 looking from the right thereof.
Figure 16:
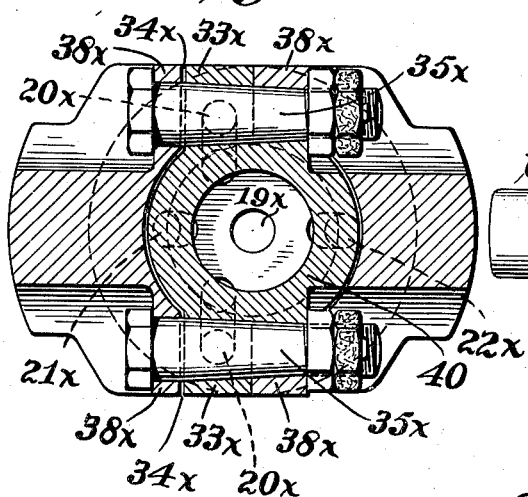
Fig. 16 is a sectional plan view of the bit head and the central upper part of the roller cutter unit assembled therewith, on line 16—16 of Fig. 12.
Figure 17:
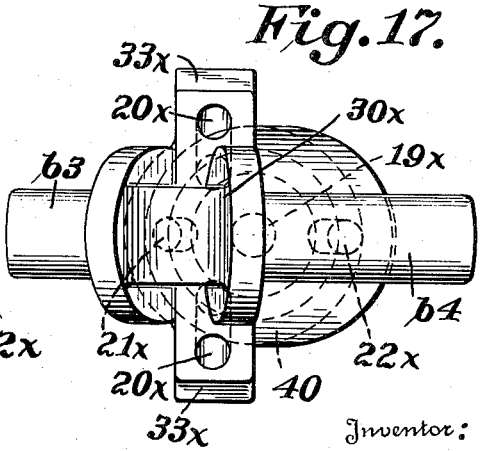
Fig. 17 is a bottom plan view of the spindle unit which carries the roller cutters.
Figure 18:
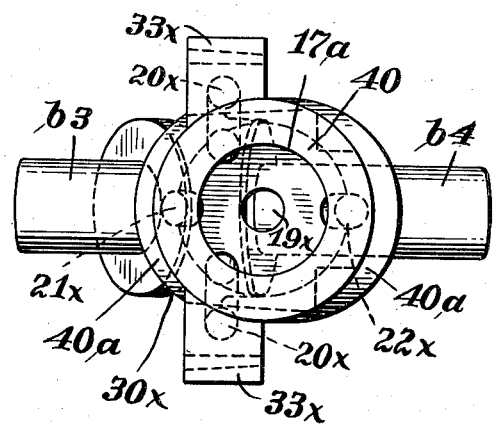
Fig. 18 is a top plan view of the spindle unit.
Figure 20:
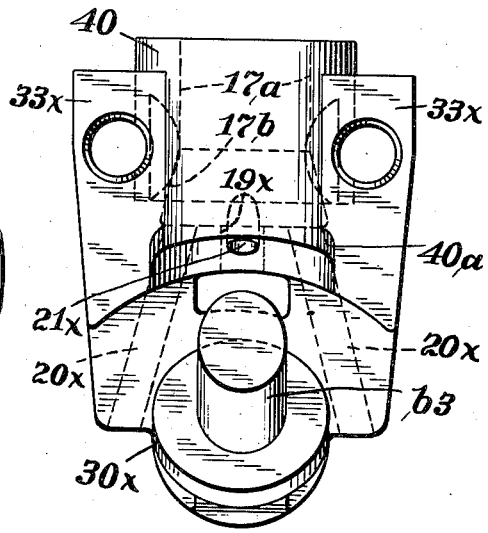
Fig. 20 is an end elevation of the spindle unit of Fig. 19 looking from the right thereof.
Figure 19:
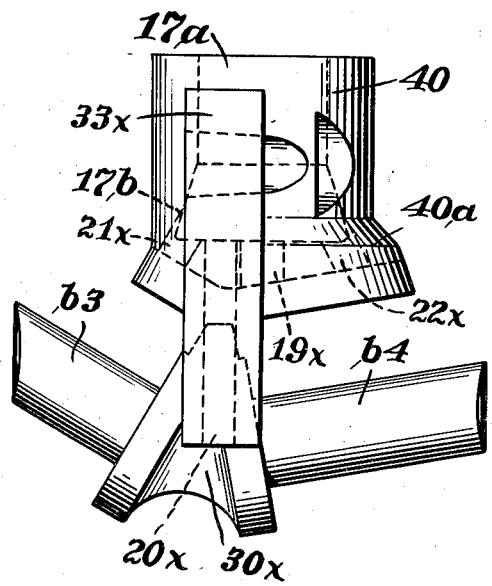
Fig. 19 is a side view of the spindle unit with the cutters omitted.
Figure 21:
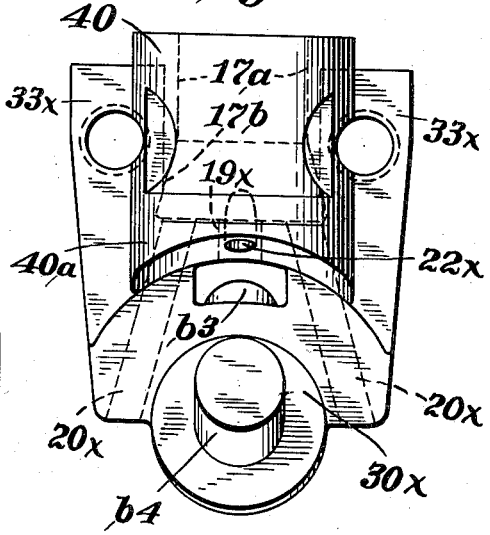
Fig. 21 is an end view of the spindle unit of Fig. 19 looking from the left thereof.

It will be noticed from Figs. 6 and 8 that the central portion 30 of the spindle assembly has recesses at 30$a$.

These receive the projections or lugs 38 of the bit head so that on the one hand we have a lug or lugs on the bit head fitting into recesses in the spindle means, and on the other hand we have lugs 33 on the spindle means adapted to fit into spaces or recesses along the side of the bit head. The spindle means is thus sustained at its central portion against thrusts from practically all directions. The spindle means or assembly may be said to consist of spindle and support members connected together and bridging the flaring recess at the bottom of the head and bearing at its end portions on the walls of the bearings (notches) in the head and bearing at its intermediate portion by the lugs and projections either on the head or spindle means or on both engaging with the opposite member.

I do not limit myself to the number of lugs 33 disclosed herein. One function of these lugs is to prevent the unit from dropping down in relation to the bit head. These lugs are not the sole reliance to take either upward thrust or lateral, or rotary, thrusts. These strains are taken in part by other means. Upward thrust is taken by depending end walls of the bit head which present the upwardly tapered recess between them for receiving the roller cutter unit and which have the upwardly converging flat inner faces 15 for receiving the upthrust and also have the upper walls of the notches 27 for receiving the upthrust from the spindles $b$, $b^1$.

Lateral thrusts are also taken by the depending end walls of the head and rotary thrust is also taken by these depending end walls having the flat inner faces 15 against which the roller cutter unit bears with flat faces thereof, i. e., in the present embodiment by the flat faces of the thrust washers 28. The side walls of the notches 27 also take the rotary thrusts through engagement therewith by the spindles $b$, $b^1$.

All the thrusts above mentioned are taken also in part by the lugs 33 and are transmitted into the main body of the bit head by the bolts 35. These lugs have lateral bearing against the walls of the recess in which they lie and against the lug 38 of the head.

Referring to Figs. 10 to 21 inclusive, which illustrate another embodiment of the invention, it may be pointed out that the bit head is of the general form of that described above with the following exceptions. The flushing fluid bore 17$x$ extends clear through this head. It does not have the central body portion at the bottom of this bore which in the form first described has the distributing ports 19, 21, 22 formed therethrough. The recesses of this head, which receive lugs or arms of the roller cutter spindle assembly, are formed as at 34$x$ through the side walls of this form of head, and these recesses are defined by lugs or projections 38$x$ on said head. The bolts 35$x$ which secure the roller cutter unit to the head in this form of the invention are of tapered form so that when these bolts are drawn by their nuts into place they will draw the free ends of the spindles $b^3$, $b^4$ into firm bearing contact with the upper walls of the notches 27$x$ of the depending end walls of the bit head to take the thrust of the cutter unit.

The spindle unit in this particular form of the invention also differs from that of the form first described though both forms have features in common.

In the present form the spindles are integrally connected together as by the triangular member 30$x$, the sides of which converge upwardly like in the first form described above. The spindles $b^3$, $b^4$ in this instance also incline upwardly and outwardly so that their free ends will bear in the notches 27x of the bit head.

In this particular form there are two roller cutters on one of these spindles and one on the other spindle.

This form does not have the triangular member recessed for a cutter like $a^3$ of the first form. It is provided, however, with upwardly extending arms or projections 33x to fit into the recesses 34x, these projections having tapered openings to receive the bolts 35x. Between these arms or projections 33x there is a cylindrical member 40 the bore of which at 17a forms a continuation of the flushing fluid bore of the bit head. This bore flares downwardly at 17b within the flaring skirt 40a of the member 40. There are flushing fluid distributing ports 19x, 21x and 22x in the bottom wall of this member 40 to direct the fluid upon the cutters in much the same way as described above in connection with the first form. There are also ports 20x.

The effects of the spindle unit bridging the recess at the lower end of the bit head with upwardly and outwardly inclined spindles, and the bearings or thrust resisting supporting means arranged at an intermediate point on said spindle unit and connected with the head, are substantially the same in this form as in the form first described.

The parts may be formed by a casting process, or otherwise.

Having described two embodiments of the invention, it will be understood that where a feature of one form can be incorporated in the other form, it may be regarded as existing in said other form, it being desirable to avoid multiplying the drawings. As an instance of this, it is pointed out that the tapered bolt may be used in the form first described for drawing the cutter unit into position in the head and holding it in place.

Figure 2:
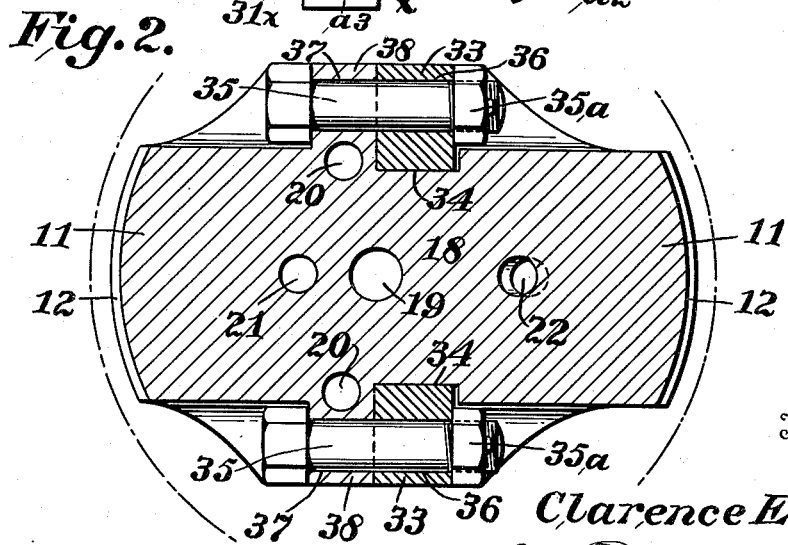
Fig. 2 is a sectional plan view on line 2—2 of Fig. 1.

It will be noted in Fig. 2, that the lug 33 fits against the lug 38, and the bolt 35 and nut 35a draw the contacting faces tightly against each other. The opposite side of the lug 33 is spaced away from the wall of the bit head. The contacting faces of these two lugs are machined to true surfaces in a plane passing through the longitudinal axis of the bit head, the surface on the lug 38 of the bit head, therefore, serves to center the carrier in the exactly required operating position in the bit head.

I claim:

1. In combination in an earth boring drill, a bit head having a recess for receiving a roller cutter unit and having end walls provided with notches, said bit head having also a recess in its side wall above the cutter unit receiving recess first mentioned, a roller cutter unit fitting into the receiving recess and having spindles fitting at their free ends into the notches, said roller cutter unit having a portion fitting into the said wall recess and means engaging with said portion and securing said portion in place in the said wall recess.

2. An earth boring drill according to claim 1 in which the securing means is located on the exterior of the head substantially as described.

3. A bit head for earth boring drills having a bore terminating at a wall extending transversely of the axis thereof said wall having a plurality of flushing fluid outlets said head having downwardly projecting end walls of less width than the central body of said head, said head at its sides and at a point intermediate the depending end walls having a projecting rib on which is a bearing surface for receiving a part of the roller cutter carrier to be removably secured to said rib, substantially as described.

4. In combination in an earth boring drill, a bit head, a cutter unit comprising spindles having their free ends bearing in notches in the bit head, and a spacer member intermediate the inner ends of the spindles, cutters mounted on the spindles, the axes of said spindles being inclined to the vertical axis of the bit head, said spindles and the spacer member being removable from the bit head, projections depending from the bit head intermediate the notches, said spacer having projections, the projections on one of said parts overlapping the other and means securing the projections together.

5. In combination a bit head having a recess in its lower face, a roller cutter unit in said recess, a bearing portion on the exterior of the bit head head wall having a surface lying in a radial vertical plane extending inwardly from the side of the bit head, a bearing member on the roller cutter unit disposed in lateral offset relation to the diametrical vertical plane of said unit and having a bearing surface complementary to the bearing surface on the said bearing on the bit head wall and means including a bolt extending horizontally through said bearing portion and bearing member for drawing the said bearing portion and bearing member together to establish the angular relation of the bit head and roller unit relative to each other.

6. In a roller bit head having a removable roller cutter carrier member with lugs for securing the same to the bit head, a closure for the flushing fluid bore of the head, said closure having a plurality of fluid outlets distributing the flushing fluid to wash the cutters and the bottom of the bore hole, said closure being carried directly by the bit head independent of and vertically spaced from the cutter carrier and rotary cutters mounted on the carrier and exposed at their upper surface to the flushing fluid above, said spaced apart carrier, substantially as described.

7. In combination in a rotary earth boring drill, a bit head having a bore for flushing fluid, downwardly opening notches in its wall, and having also a bearing portion presenting a vertical bearing surface on its exterior provided with a bolt hole whose axis is horizontal, a roller cutter carrier having a bearing member also presenting a vertical bearing face and located exterior to said carrier, and fitting with its bearing face against the bearing face of the bearing portion on the bit head, said bearing member also having a bolt hole, spindles on the roller cutter carrier inclining upwardly with their free ends in the open notches, and a bolt passing through the bolt holes horizontally and having a taper to draw the spindles up against the walls of the notches and to draw the bearing portion of the head and the bearing member of the cutter carrier together, substantially as described.

8. In combination, a bit head having a recess in its lower face, a roller cutter carrier in said recess, said bit head having a portion provided with a radial driving face thereon above the spindles of the roller cutter carrier, said driving face extending vertically at the side of the head, a bearing member on the roller cutter carrier having a bearing surface complementary to the said driving face, and means drawing the said driving face and bearing surface together in a direction perpendicular to said face and surface.

9. In combination in an earth boring drill, a bit head having a recess receiving a roller cutter unit and provided with downwardly opening notches in its walls, and with an exteriorly disposed upper recess in the side of the head opening outwardly and downwardly, said roller cutter unit comprising a carrier member having roller cutter supporting spindles projecting therefrom at different sides thereof and lying at their free ends within the notches and having a portion fitting into said upper recess and exposed at the outer side of the head, and means at said upper recess on the head engaging the said portion of the carrier drawing the same upwardly and seating the free ends of the spindles against the walls of the notches and roller cutters mounted on the spindles and lying between the carrier and the notched walls of the bit head, substantially as described.

10. Carrier means for a roller cutter to be assembled with a bit head of an earth boring drill, said carrier means having a spindle portion for mounting a roller cutter thereon and having another portion independent of the ⁻¹le portion to be engaged by a removable securing member at the side of a bit head above the cutter, the spindle having a free end to engage a seat on a bit head with which it is to be associated and the other portion being offset laterally in respect to the vertical axis of the carrier and fitted to be received in a recess opening outwardly at the side of a bit head above the cutter, said independent portion having means by which the carrier may be attached to a bit by said removable securing member.

11. A roller cutter unit for earth boring drills, comprising spindles and supporting means therefor, cutters on the spindles, said supporting means lying between and attached to the inner ends of the spindles and having a lug independent of and spaced apart from the spindles projecting upwardly and laterally for attachment to the side wall of a bit head and having also a recess to receive a projection from a bit head with which it is to be associated, substantially as described.

12. A roller cutter bit head having flaring end walls with downwardly opening bearing notches at their extreme lower ends to receive roller cutter spindles, and having at a point intermediate said bearing notches an integral projection extending downwardly to engage with a recess in a cutter carrier, said projection having a bearing face substantially coextensive therewith and lying in a plane parallel to the vertical axis of the bit head and said bearing face extending upwardly on and laterally from the exterior of the bit head and extending to the side thereof, said projection having means by which a roller cutter carrier may be affixed thereto.

13. In combination, a bit head having depending end walls with bearings therein for the spindles of roller cutters and having integrally therewith at a point on its side intermediate of said end walls, a projection extending laterally beyond and downwardly below the bit head, and a carrier for the roller cutter spindles adapted to fit between the said end walls and having a vertically extending recess to receive the projection from the bit head.

14. A roller bit head having bearings in its wall, the axes of which bearings are inclined to the vertical axis of said head, said head having also a bearing surface located in a vertical plane and extending to the side of said head intermediate the said bearings and an intermediate projection extending downwardly between roller cutters when roller cutters are mounted in said head, said projection having a flushing fluid passageway therein, substantially as described.

15. A roller bit head according to claim 14 having a series of recesses in its side and above the bearings in the wall and intermediate said bearing.

16. A roller bit head having a cutter recess in its lower end defined by flaring walls having bearing openings therein whose walls are inclined to the vertical axis of the head, a bearing having a surface disposed in a vertical plane passing through the axis of the head, said bearing surface extending to the side of said head intermediate the flaring walls, the head having a downwardly extending projection adjacent the intermediate bearing surface and a recess in the side of the head adjacent the intermediate bearing and opening outwardly of the side of the head.

17. In combination, a bit head having depending walls with a recess between them, a roller cutter carrier fitting in said recess and having spindles for the roller cutters inclining upwardly and outwardly in different directions and bearing the depending walls, and roller cutters on said inclined spindles, the space between the sides of the cutters tapering upwardly by reason of the inclined relation of said cutters, said carrier having a projection extending downwardly between said cutters, and a flushing fluid passageway in said projection, said carrier having a projection extending upwardly and bearing laterally on a surface of the bit head, said surface being in a vertical plane passing through the axis of the bit head and extending to the side of the said head, said projection being independent of the cutter spindles and located at a point intermediate the location of said spindles.

18. An earth boring drill having a head provided with means for attachment to a drill stem, and a cutter carrier member attached thereto and having a downwardly facing recess with cutter means therein at one side only of and adjacent the vertical axis of the drill, and on a horizontal axis, upwardly and outwardly extending spindle means supported by the carrier member, and mounted at the outer end in a downwardly open notch in the bit head, said spindle lying on the opposite side of the vertical axis of the drill from that upon which the first mentioned cutting means lies, a rotary side cutter on said spindle, a rotary cutter also on said spindle, intermediate the side cutter and the said first mentioned cutter means, all said rotary cutters and rotary cutter means having their axes in the same vertical plane, and cutting over the entire area at the bottom of the hole, and other rotary side cutter means tracking the first mentioned side cutter means.

19. A carrier for a roller cutter of an earth boring drill having an outer side face inclined to the vertical axis of the drill, said face having a socket therein directed outwardly for holding a spindle directed outwardly from said face, and having also upwardly extending arms located apart from the spindle receiving socket for attachment to a bit head.

20. A carrier for a roller cutter of an earth boring drill having an outer side face inclined to the vertical axis of the drill, said face having a socket therein directed outwardly for receiving a spindle directed outwardly from said face, and having also upwardly extending arms located apart from the spindle receiving socket for attachment to a bit head, said carrier having a recess in its lower end to receive a roller cutter adjacent to and at one side of the vertical axis of the drill.

21. A carrier for a roller cutter to be assembled with a bit head of an earth boring tool, said carrier having spindles projecting outwardly for mounting roller cutters, and having arms projecting laterally from the carrier and apart from said spindles, said arms having means for engaging with a removable securing member for attaching the carrier to a bit head.

22. Roller cutter carrier means according to claim 10 in which said means of said independent portion includes a bolt hole through said independent portion.

23. In combination in an earth boring drill, a bit head and a carrier having spindles mounting roller cutters, said bit head having an exterior laterally projecting vertically extending flange for attaching the carrier to the bit head in fixed relation, said flange having a flushing fluid port therethrough communicating with a central bore of the bit head and directing a stream of fluid upon the hole bottom.

24. A carrier for a roller cutter to be mounted in a bit head of an earth boring tool, said carrier having an upper body portion and a lower spindle supporting portion of triangular shape in vertical cross-section, and a laterally projecting vertically extending web connecting said portions and providing a means for attaching the carrier to a bit head.

25. A bit head, for an earth boring drill, having a recess to receive a roller cutter carrier, the end walls of which recess are provided each with a notch to receive the free end of a roller cutter spindle, said bit head having also a laterally and downwardly opening recess in its wall above the cutter receiving recess and an opening in the head in communication with the said laterally and downwardly opening recess to receive securing means for the roller cutter unit, substantially as described.

26. A bit head having a cutter receiving recess in its under side and having downwardly flaring end walls with notches therein to receive spindles on which roller cutters are mounted, said head having a downwardly and laterally opening recess in its side wall above the cutter receiving recess, the thrust bearing surface of which lies in a plane extending transverse to the plane of the axis of one of the notches and removable securing means for a roller cutter assembly extending across the said side recess, substantially as described.

27. A bit head having end walls with bearing openings therein to receive roller cutter spindles, said openings having their axes inclined to the vertical axis of the head, and a projection at the side of said head intermediate the end walls adapted to fit against a part of a roller cutter carrier which may be mounted on the bit head, said projection extending downwardly and having a flushing fluid passage directed outwardly.

28. A carrier for roller cutters of an earth boring drill, having a body portion from which roller cutter supports project downwardly, with a cutter recess centrally located between and completely separating them, said body having a side cutter recess therein, and a spindle seat recess in the inner face of each of said supports communicating with the said cutter recess and on coinciding horizontal axes, said carrier having a projection extending upwardly and laterally from the body portion thereof, and having means for attachment to a drill head.

29. In combination, a bit head having downwardly extending walls with upwardly and inwardly inclined inner faces, side roller cutters arranged adjacent said inclined faces on spindles inclining upwardly and outwardly in radial planes, said spindles having their outer ends supported in said walls, and intermediate cutter means for cutting the area at the center of the hole, the latter cutter means being on an axis perpendicular to the vertical axis of the drill head, said perpendicular axis extending in the same general direction with a vertical plane in which the axis of one of said side cutters cutting an area at the side of the hole including clearance for the bit head lies.

CLARENCE E. REED.